United States Patent [19]

Jardin et al.

[11] 4,062,636

[45] Dec. 13, 1977

[54] ELONGATE CYLINDRICAL MEMBERS SECUREMENT

[75] Inventors: Hans Jardin, Krailling; Johann Ofner, Pucheim-Ort, both of Germany

[73] Assignee: Webasto-Werk W. Baier GmbH & Co., Germany

[21] Appl. No.: 664,677

[22] Filed: Mar. 8, 1976

[30] Foreign Application Priority Data

Mar. 17, 1975 Germany .................. 7508398[U]

[51] Int. Cl.² .............................................. B25G 3/00
[52] U.S. Cl. ...................................... 403/13; 403/311; 403/201; 403/344; 296/137 E
[58] Field of Search .............. 403/311, 310, 314, 11, 403/13, 14, 405, 344; 285/419; 296/137 E

[56] References Cited

U.S. PATENT DOCUMENTS 287,651  10/1883  Faust ................................. 403/311

FOREIGN PATENT DOCUMENTS 632,189  11/1949  United Kingdom ................. 403/311

*Primary Examiner*—Wayne L. Shedd
*Attorney, Agent, or Firm*—Craig & Antonelli

[57] ABSTRACT

The present invention comprises an inter-fitting, two-part securing means which holds a flanged end of an elongated cylindrical actuating cable guidance tube in its operative position on a support in a vehicle. The securing means comprises a pair of generally semi-cylindrical body parts which, when assembled, form a through bore for the cable, and guidance tube with opposed recesses in the bore which receive and hold the guidance tube flange. One of the pair of body parts has a flanged end and is inserted through a noncircular hole in the support with the flange clamped against the support. Substantially diametrically outwardly extending ribs on the other end of the one body part are slidingly received in complementary grooves on the other of the pair of body parts. Integral spring finger means locks the pair of body parts in assembled relation.

9 Claims, 3 Drawing Figures

ELONGATE CYLINDRICAL MEMBERS SECUREMENT

The present invention relates to securing elongate cylindrical members and has particular, but not exclusive, application, to securing an end of a cable guidance tube accommodating a compression rigid cable for operating a vehicle sliding roof.

Hitherto locating members for securing an end of a cable guidance tube of a vehicle sliding roof assembly have been complicated and expensive to manufacture and in installation required a relatively long time for location of the tube. It is an object of this invention to provide a locating member of relatively simple construction which is relatively inexpensive to manufacture and facilitates location of the tube.

According to the present invention, there is provided a locating member for securing an elongate cylindrical member to a support, which locating member comprises a pair of body parts having mutually complementary part-cylindrical channels and one of said body parts is adapted to be secured to said support, said body parts being adapted to slidably engage one another by relative axial movement from an axially spaced (i.e. "unassembled") configuration, where each channel partially accommodates a respective portion of the said cylindrical member, to an axially coincident (i.e. "assembled") configuration, where said channels are aligned to accommodate between them a portion of said cylindrical member.

Preferably, the locating member of the invention includes locking means to restrain axial movement of the body parts from their assembled configuration towards their unassembled configuration. Suitably, said locking means can comprise a catch on one body part adapted to engage behind (with respect to the direction of the said axial movement into the assembled configuration) an abutment member on the other body part. This catch advantageously is movable radially with respect to its body part and is resiliently biassed towards its radially outer extremity. For example, the locking means can be a resilient tongue adapted to engage behind a shoulder on the other body part. Other locking means can also be used such as for example a projection located on one body portion which engages in a slot in the other body portion. Advantageously, the locking means is readily releasable to allow mutual axial movement of the body parts from their assembled to their unassembled configuration.

Usually, but not necessarily, the part-cylindircal channels will be of semi-circular cross-section to accommodate half of the cross-sectional area of the elongate cylindrical member.

One of the body parts can have a pair of radially and axially extending ridges whilst the other body part has a complementary pair of radially and axially extending grooves to slidably receive respective ridges on axial movement of the body parts from their unassembled to their assembled configuration, whereby to mutually engage said parts. In order to prevent lateral transposition of the body parts when the ridges are symmetrically disposed, the cross-sectional dimensions of one ridge or flange and its respective groove can be of different dimensions, such as thickness, of those of the other ridge and groove so that each ridge will only fit the intended groove.

The interengaging portions of the body parts can be of complementary substantially part-cylindrical shape with coaxially aligned channels therein. Suitably, said parts are of semi-cylindrical cross-section.

The locating members of this invention can be designed to secure any elongate cylindrical member at any portion thereof. However, they are particularly intended to secure a flanged end of such a cylindrical member. It is preferred therefore that one body part should have a groove extending circumferentially from its channel to receive said flanged end. It is particularly preferred that the locating member should be adapted to receive the flanged end of a cable guidance tube or the like tube or sheath.

One of the body parts advantageously has a portion adapted to be non-rotatably received in a complementary hole in a locating or supporting plate. Having regard to the particular application of the invention to vehicle sliding roofs, it is also preferred that said member should be adapted to be clamped between a hollow axle motor and said locating plate axially spaced therefrom.

The locating member can be made of resilient plastic material such as a polyamide.

The invention also provides a control mechanism for a vehicle sliding roof comprising a control cable which is rigid in compression and movable in a cable guidance tube to operate a sliding panel of said roof wherein an end of the said tube is secured in a locating member of the present invention.

The following is a description by way of example only and with reference to the accompanying drawings of a locating member in accordance with a preferred embodiment of the present invention. In the drawings:

Description of the Preferred Embodiment

Figure 1:
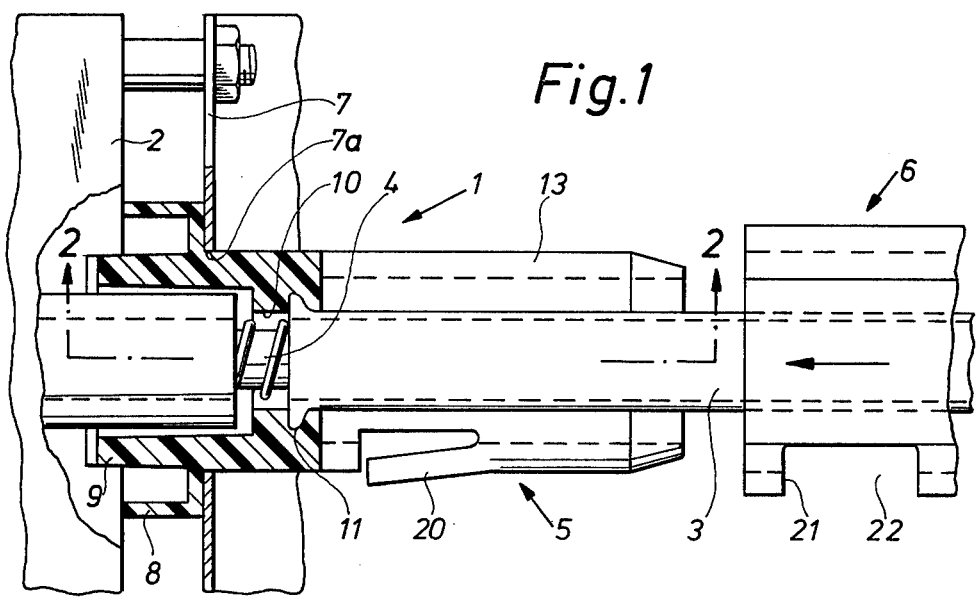
FIG. 1. is a longitudinal section through the locating member in an unassembled configuration.

Referring to the Figures, a locating member 1 according to a preferred embodiment of the invention connects a hollow shaft motor 2 and a cable guidance tube 3 for a cable 4 which is rigid in compression serving for the displacement of a sliding roof member of a vehicle sliding roof.

The locating member 1 comprises two body portions 5 and 6. Portion 5 is inserted in non-rotational manner in a rectangular opening 7a of a supporting plate 7 the portion 5 having a surface complementary to the opening 7a. Portion 5 has a cup-shaped radial flange 8 located between said plate 7 and the hollow shaft motor 2 and secured therebetween by securely screwing motor 2 to supporting plate 7. The left-hand end 9 of portion 5 (as viewed in FIGS. 1 and 2) is centred in the hollow shaft motor 2. Portion 5 also has a bore 10 for receiving cable 4 against radial movement, as shown, and a semi-circular groove 11 for receiving a flanged end 12 of tube 3 against axial movement, also as shown.

Figure 2:
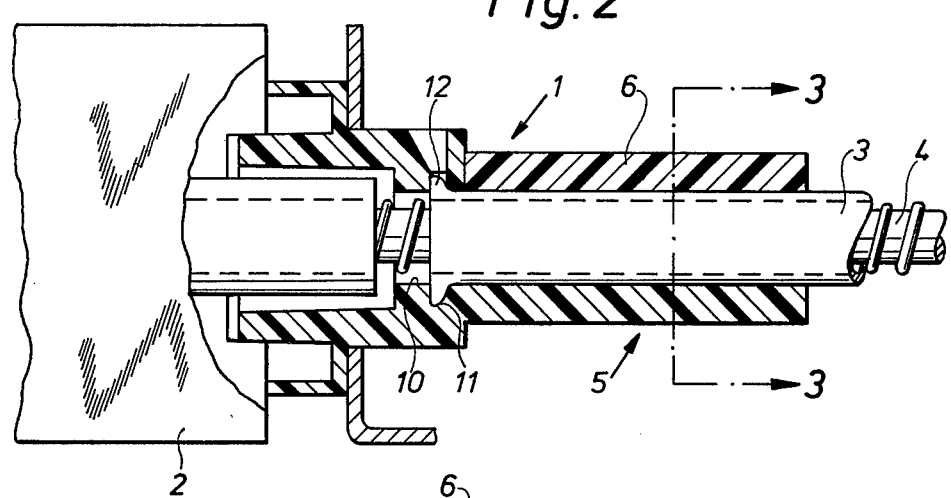
FIG. 2 is a longitudinal section along the line 2—2 of FIG. 1 but with the locating member assembled.
Figure 3:
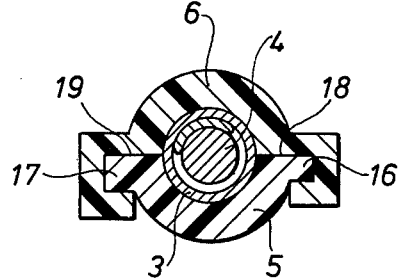
FIG. 3 is a section along the line 3—3 of FIG. 2.

Portion 5 has a section 13, FIG. 1, which serves to receive the end section of tube 3. Section 13 has a semi-circular cross-section and two radially and axially extending flanges 16 and 17. The other portion 6 can be slid onto this section 13 and for this purpose has two longitudinal grooves 18 and 19 for receiving flanges 16 and 17. When portion 6 is slid (i.e. mounted) onto section 13, cable guidance tube 3 is secured in immovable manner. A locking device which acts in the mounted position of portion 6 ensures that there can be no unintentional detachment of this portion. In the present embodiment, the said locking device comprises a resilient tongue 20 extending from portion 5, which, with portion 6 mounted, engages behind a shoulder 21 on said portion 6. If the locking device is to be made releasable, a cutout 22, FIG. 1, can be provided in portion 6 through which tongue 20 can be inserted by manipulation from outside the locating member in order to be able to disengage tongue 20 from shoulder 21 and thereby remove portion 6 from section 13.

To prevent portion 6 being slid onto section 13 in a laterally transposed manner, which would result in locking tongue 20 not cooperating with shoulder 21, flanges 16 and 17 and the associated grooves 18 and 19 have different dimensins. Thus, in the present embodiment, flange 17 is thicker than flange 16 and correspondingly groove 19 is wider than groove 18, thus ensuring that portion 6 can only be slid onto section 13 in a particular manner, so that tongue 20 cooperates with shoulder 21.

The invention is not restricted to the details described above and numerous modifications and variations can be made without departing from the scope of the invention defined in the following claims. In particular, the locating member can readily be adapted for securing ends of other tubes, for example, Bowden cables.

What we claim is:

1. A locating member for securing a tube to a support comprising two body portions having complementary part-cylindrical channels of semi-circular cross-section for closely accommodating said tube, means on one of said portions for securing said one of said portions to said support, said one portion having means for holding said tube against relative axial movement, one of said portions having a pair of opposed radially-extending ridges and the other of said portions having a pair of complementary axially extending grooves for slidably receiving said ridges on axial movement of one portion relative to the other from a disassembled to an assembled configuration where said tube is fixed between said portions in an axial as well as in radial direction, and locking means on the portions to restrain relative axial movement of the portions from their assembled towards their disassembled positions.

2. A locating member as claimed in claim 1, wherein the securing means comprise complementary noncircular engaging surfaces on the said one position and said support so that the said one portion is non-rotatably mounted to said support.

3. A locating member as claimed in claim 1, wherein said locking means comprise a radially movable catch member on one of said portions engaging in the assembled configuration behind an abutment on the other portion, said catch member being in the shape of a tongue on the outer surface of the respective portion with one end attached to that portion and the other end spreading radially outwardly to engage said abutment.

4. A locating member as claimed in claim 1, wherein the cross-sectional dimensions of one ridge and its respective groove are different from those of the other ridge and groove.

5. A locating member as claimed in claim 1, wherein one body portion has a groove extending circumferentially from its channel to receive a flange on said tube.

6. A locating member as claimed in claim 1, formed of resilient plastic material of the group including polyamide.

7. A locating member as claimed in claim 1, in combination with a sliding panel of a vehicle sliding roof wherein said tube accomodates a control cable rigid in compression and movable to operate said sliding panel.

8. A locating member as claimed in claim 1, wherein said holding means comprise a groove on one of said one portion and said tube and a flange on the other engaging in said groove.

9. A locating member as claimed in claim 8, wherein said flange is on the end of said tube.

* * * * *